US008068323B2

(12) United States Patent
Mughal et al.

(10) Patent No.: US 8,068,323 B2
(45) Date of Patent: Nov. 29, 2011

(54) CIRCUIT PROTECTOR MONITORING AND MANAGEMENT SYSTEMS AND METHODS

(75) Inventors: Owais Mahmood Mughal, Warrenton, MO (US); Frank Anthony Doljack, Pleasanton, CA (US)

(73) Assignee: Cooper Technologies Company, Houston, TX (US)

( * ) Notice: Subject to any disclaimer, the term of this patent is extended or adjusted under 35 U.S.C. 154(b) by 252 days.

(21) Appl. No.: 12/359,577

(22) Filed: Jan. 26, 2009

(65) Prior Publication Data

US 2010/0188187 A1    Jul. 29, 2010

(51) Int. Cl.
*H01H 85/24*    (2006.01)
(52) U.S. Cl. .......................... 361/103; 337/225
(58) Field of Classification Search .................. 361/103, 361/104; 337/225
See application file for complete search history.

(56) References Cited

U.S. PATENT DOCUMENTS

| | | | |
|---|---|---|---|
| 7,369,029 B2 | 5/2008 | Ackermann | |
| 7,391,299 B2 | 6/2008 | Bender et al. | |
| 7,576,635 B2 | 8/2009 | Bender et al. | |
| 7,612,654 B2 | 11/2009 | Bender et al. | |
| 2006/0077607 A1 | 4/2006 | Henricks et al. | |
| 2006/0268482 A1* | 11/2006 | Lin et al. | 361/62 |
| 2008/0231410 A1 | 9/2008 | Doljack et al. | |
| 2009/0040014 A1 | 2/2009 | Knopf et al. | |
| 2010/0045464 A1* | 2/2010 | Knopf et al. | 340/573.1 |

* cited by examiner

*Primary Examiner* — Danny Nguyen
(74) *Attorney, Agent, or Firm* — Armstrong Teasdale LLP (57) ABSTRACT

Electronic systems and methods automatically monitor a presence, absence, and change of circuit protectors at specified locations in an electrical system. Circuit protectors may be automatically detected and correlated with specific circuit protection holders as they are installed and replaced in the electrical system. Determinations may be made regarding whether the installation or replacement is proper or improper for optimal protection of the electrical system.

43 Claims, 4 Drawing Sheets

CIRCUIT PROTECTOR MONITORING AND MANAGEMENT SYSTEMS AND METHODS

CROSS REFERENCE TO RELATED APPLICATIONS

This application relates in part to subject matter disclosed in U.S. application Ser. No. 12/359,518 filed Jan. 26, 2009 and entitled System and Method for Ensuring Proper Use of Personal Protective Equipment for Work Site Hazards, the disclosure of which is hereby incorporated by reference in its entirety.

This application also relates in part to subject matter disclosed in U.S. application Ser. No. 12/059,950 filed Mar. 31, 2008 and entitled RFID Open-Fuse Indicator, System and Method, the disclosure of which is hereby incorporated by reference in its entirety.

BACKGROUND OF THE INVENTION

The field of the invention relates generally to circuit protection components, and more specifically to monitoring systems and methods for ensuring correct installation of circuit protectors such as fuses.

Electrical systems typically include a number of circuit protection devices that protect electrical circuitry, equipment, and components from damage. Overcurrent protection devices, for example, are constructed to physically open or interrupt a circuit path and isolate electrical components from damage upon the occurrence of specified overcurrent conditions in the circuit. Known circuit protection devices include devices such as fuses, circuit breakers, and limiters, which may address overcurrent, overload, and short circuit conditions in an electrical system, and other switching devices. As the size and complexity of electrical systems increase, the number of associated circuit protection devices also typically increases. Managing a complex electrical system having a large number of circuit protectors is challenging. Circuit protectors of various types and ratings may be involved in the electrical system at various locations. Ensuring that the proper type and rating of the circuit protectors are correctly installed, serviced and maintained in the electrical system presents practical challenges.

BRIEF DESCRIPTION OF THE INVENTION

Electronic management systems and methods executed by such systems are disclosed that, among other things, automatically monitor a presence, absence, and change of circuit protectors at specified locations in an electrical system. Circuit protectors may be automatically detected and correlated with specific circuit protection holders as they are installed and replaced in the electrical system. Determinations may be made regarding whether the installation or replacement is proper or improper for optimal protection of the electrical system. That is, the systems and methods ensure that installed circuit protectors are of the correct type and rating for their particular location in the electrical system to ensure that the electrical system is adequately protected from, for example, overcurrent events or other undesirable operating conditions in the electrical circuitry of the system.

The systems and methods may provide notification of absent circuit protectors, mismatched circuit protectors, or improperly installed circuit protectors such as electrical fuses or other known circuit protectors so that human errors in selecting and installing circuit protectors may be promptly identified and corrected. Real time inventories of installed circuit protectors may be made readily available to facility managers and the like for the beneficial use thereof.

Additionally, the systems and methods may optionally monitor operating states of the circuit protectors after they are installed and detect open circuit events attributable to the circuit protectors as they operate. The systems and methods may provide notification of operated circuit protectors with specific identification of operated circuit protectors and their locations. Servicing, removal and replacement of operated circuit protectors may be monitored and confirmed as completed correctly. Otherwise, notification may be generated and communicated to facility managers, technicians, and the like to correct any detected errors concerning the circuit protectors during service and maintenance procedures.

Still further, the systems and methods may optionally monitor a recommended use of personal protective equipment by persons accessing the circuit protectors to ensure compliance with applicable worker safety standards and procedures.

The systems and methods may be implemented in a low cost and user friendly manner using, for example, radio frequency identification (RFID) technology and innovative operating algorithms. The monitoring systems and methods may be retrofitted to existing electrical systems at relatively low cost by introducing identification elements recognized by the system to the circuit protection holders in the electrical system.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE INVENTION

Exemplary embodiments of circuit protector monitoring and management systems are disclosed that overcome numerous problems and disadvantages in the art. Improperly installed circuit protectors may be electronically detected and efficiently resolved using relatively low cost techniques that are readily adaptable to retrofit installation to existing electrical systems. Monitoring of operational states of circuit protectors is also possible, as well as monitoring of personal protective equipment for workers to use when responding to open circuit events attributable to the circuit breakers. Workers may be directed to specific locations in the electrical system by the management system, and the workers may be provided with specific instructions of tasks to be performed to restore full operation of the circuitry in the electrical system. Correct execution of such tasks performed by workers may be electronically confirmed by the management system, and mistaken or improperly installed circuit protectors may readily identified for prompt correction. Real time inventory of installed fuses, their geographic location (at an electrical panel level), and their operating states may advantageously be presented to facility managers and the like.

In order to understand the invention to its fullest extent, the following disclosure will be divided into different parts or sections, wherein Part I discusses problems in the art; Part II discusses exemplary systems overcoming such problems; and Part III discusses exemplary processes and algorithms executable by the systems described in Part II.

I. Introduction to the Invention

For purposes of the present discussion, it is assumed that a proper and correct analysis has been made regarding the necessary or appropriate quantity and selection of circuit protectors needed to effectively protect an electrical system in appropriate locations. As previously mentioned, circuit protector devices such as fuses, circuit breakers, and limiters may be utilized to address overcurrent, overload, and short circuit conditions in an electrical system. Various types of switching devices may likewise used to regulate operation of the electrical system, either in tandem with or separate from such circuit protectors. Even in well designed and engineered electrical systems, problems may nonetheless occur.

Effectively maintaining an electrical system with a large number of circuit protectors presents at least two primary problems. First, as an initial matter the correct type and rating of circuit protectors must be installed at the correct location in the electrical system. Second, when from time to time it is necessary to service or replace circuit protectors in the system, the correct type and rating of circuit protector must remain in place. Given a rather large number of circuit protectors of various types and ratings that are available, many of which may appear to be practically interchangeable in use but in reality are not, there is opportunity for human error and confusion in installing circuit protectors which may result in installation of one or more circuit protectors of an incorrect type, grade or rating in the electrical system.

For example, in the case of circuit protector fuses, various configurations of fuse elements or assemblies may be provided in similar casings having similar terminal structure. The different configurations of fuse elements or assemblies may result in fast acting fuse element operation, time delayed fuse element operation, or other variation in physical behavior when connected to electrical circuitry that would affect the operation of the fuse to open a current path to isolate an electrical connection established through the fuse. Because such fuses may physically look alike, one may mistakenly choose a fuse of the wrong type. Further, in some cases when a fuse of the proper type is not available on site at the time, workers have occasionally been known to intentionally replace an operated fuse with another type of fuse that is available on site simply to restore affected circuitry without additional delay. Similarly, fuses of the same type are generally available in different voltage and current ratings, so even if one selects the proper fuse type, it is still possible to select a fuse having the wrong rating, either intentionally or unintentionally, when maintaining the electrical system. Aside from vulnerability to circuit conditions that may arise at some point, improper or mismatched circuit protectors can cause undesirable performance variations in the electrical system.

Regardless of how or when it might occur, installation of circuit protectors of the wrong type or rating can compromise the protection of the electrical system from potentially damaging operating conditions to some of the components in the circuitry, as well as the proper operation of the electrical system. Improper installation in the first instance, or improper replacement of a circuit protector after the fact, can lead to false beliefs that the system is fully protected when in reality it is not. The consequences of such a false belief can be severe if damaging circuit conditions actually occur but proper circuit protectors are not in place. This problem is perhaps particularly so for electrical fuses and other circuit protectors that must be removed and replaced once they have operated to open a circuit path, but exists to some extent for most types of circuit protectors.

Importantly, vulnerabilities of electrical systems due to improperly installed circuit protectors may not be evident and can be difficult to detect even by diligent workers, especially in electrical systems having a large number of circuit protectors. Because many circuit protectors may be in place for extended periods of time before operating, if they ever do, sub-optimal operation of the electrical system may continue indefinitely until improper or mismatched circuit protectors are found and corrected.

In the case of some circuit protectors such as fuses, fuse rejection features are known that will frustrate attempts to install an improper fuse type or rating in an electrical system. Such fuse rejection features are typically mechanical in nature, wherein the terminals of the fuse holders will only accept a predetermined type of fuse having complementary features. While such fuse rejection features can indeed be helpful in some installations, their use has been rather limited to a small subset of fuse types, and for a good deal of available fuses such fuse rejection features are not practical and would entail prohibitive costs and design changes to fuses and their holders to implement full scale in a complex electrical system.

Another problem that exists in complex electrical systems including a large number of circuit protectors, any one of which may operate at any given time to isolate portions of the circuitry in the electrical system, is efficiently locating operated circuit protectors in response to open circuit events. Recently, electronic monitoring systems have been developed involving status elements corresponding to installed circuit protectors that aid in automatically detecting and remotely identifying operated circuit protectors so that they may be quickly serviced or replaced to restore affected electrical circuitry. To some extent, such systems may also serve to identify improperly installed circuit protectors via information collected through the status elements associated with the fuses. Existing systems of this type, however, can be rather sophisticated and costly for many electrical systems. Simpler, lower cost options for monitoring and managing circuit protectors in an electrical system are desired.

II. Exemplary Systems of the Invention

Figure 1:
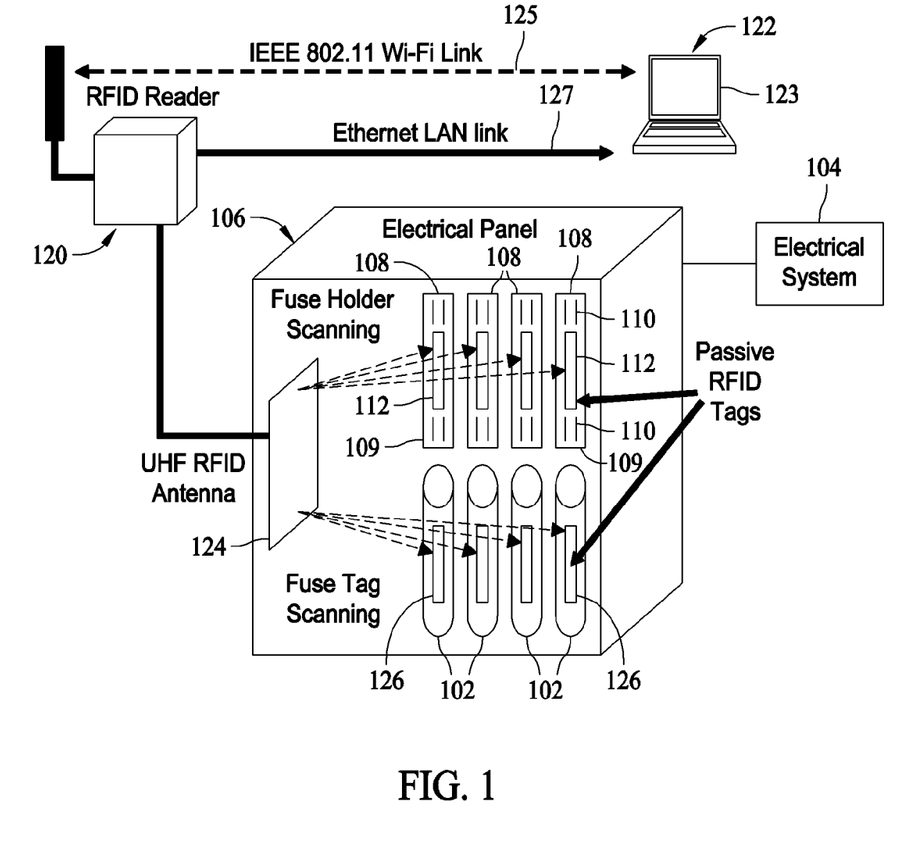
FIG. 1 is a schematic illustration of an exemplary circuit protector monitoring and management system.

Exemplary electronic monitoring and management systems adapted to overcome these and other difficulties in the art will now be explained. While the monitoring systems will be described below principally in the context of electrical fuses for overcurrent protection purposes, it is to be understood that the monitoring systems described below may equally apply to other known circuit protector devices for the same or other purposes. That is, the following description concerning application of exemplary systems for fuse monitoring purposes is provided for purposes of illustration rather than limitation. In other embodiments the monitoring systems may be applied to different circuit protectors, including but not limited to circuit protectors addressing overcurrent, overload, and short circuit conditions FIG. 1 is a schematic illustration of an exemplary circuit protector monitoring and management system 100 that automatically monitors, detects and verifies installation of proper circuit protectors 102 that provide, for example, overcurrent protection to a portion of an electrical system 104. The electrical system 104 may, in different embodiments, be an AC or DC power system supplying electrical power from a power supply, whether internal or external to the electrical system 104, to various electrical loads.

As depicted in FIG. 1, the electrical system 104 may include one or more circuit protector panels, a circuit protector block, or a circuit protector cabinet (collectively referred to herein as "the panels 106"). The panels 106 may each include a number of circuit protection holders 108 providing line and load connections to the respective circuit protectors 102. The circuit protector holders 108, in exemplary embodiments shown, include a nonconductive base 109 and conductive terminal elements 110. The circuit protector holders 108, in cases where the circuit protectors 102 correspond to electrical fuses, are sometimes referred to as fuse holders. While the fuse holders 108 as shown are mounted to one of the panels 106, it is contemplated that one or more of the fuse holders 108 need not necessarily reside in one of the panels 106, but may be located in other locations desired.

A variety of fuse holders 108 are known in the art that receive and accommodate various types of fuses 102. The fuse holders 108 may include for example, terminal elements 110 such as conductive clips that receive conductive terminal ends, sometimes known as end caps or ferrules of the fuses 102, when the fuses 102 are inserted into the fuse holder 108. As such, the fuses 102 are mechanically and electrical connected or terminated to the clips 110 when the end caps or ferrules are received in the clips, thereby completing a circuit path through the fuses 102 between the terminal elements 110.

The circuit path through each respective fuse 102 includes a known fuse element or fuse element assembly that melts, disintegrates, or otherwise structurally fails when a predetermined overcurrent condition occurs at the location of the fuse 102, thereby opening the circuit path and creating an open circuit across the fuse 102 and electrically isolating the line and load side terminal elements 110 of the fuse holder 108. Once one or more of the fuses 102 has opened or operated to create an open circuit, the operated fuses 102 may be removed from the fuse holder 108 and replaced with another one to again complete the circuit path between the line and load side terminal elements 110 of the fuse holder 108.

While generally cylindrical-shaped fuses 102 are shown in FIG. 1, fuses of other shapes and configurations may likewise be used, such as rectangular shaped cube fuses known in the art. Additionally, other termination structure may be provided in the fuse holders 108 to accept, for example, terminal blades or other terminal structure of so-called male or female fuses. While four fuse holders 108 are shown in FIG. 1, any number of fuse holders 108 may alternatively be provided.

Each of the circuit protector holders 108 is provided with a circuit protector holder identification element 112. The circuit protector holder identification element 112, as explained below, functions to allow the circuit protector monitoring and management system 100 to identify the circuit protection holders 108, automatically detect a presence or absence of one of the circuit protectors 102 in each of the holders 108, as well as confirm that the circuit protectors 102 are the correct type and rating for their respective holders 108.

The monitoring system 100 includes in the exemplary embodiment shown if FIG. 1 a reader or detector 120, and a processor-based device 122 that may be remotely located from the detector 120. The detector 120 and the processor-based device 122 may be integrated into a single device serving the functions described herein, or may be separate devices communicating with one another as shown. Also, in some embodiments, the reader 120 may itself be a local, processor-based device communicating with a remote processor-based device 122. In still another embodiment, the processor-based device may be local and physically proximate the detector 120, but still cooperating with the reader or detector 120 to provide the functionality described below. That is, the functionality described herein may be distributed amongst more than one processor-based device as necessary or as desired to implement monitoring systems of varying degrees of sophistication.

As used herein, the term "processor-based device" shall refer to portable or non-portable computers, hand-held electronic devices, or other devices including processors, microprocessors, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based device."

In the embodiment shown in FIG. 1, the processor-based device 122 may be a personal computer or notebook computer including a display 123, and may serve as a data collector, reporting and analysis tool for persons responsible for operating the electrical system 104. Among other things, the processor-based device 122 provides electronic confirmation and notification of installed circuit protectors 102 to ensure that circuit protectors 102 of the proper type and grade are installed at the correct locations in the circuit protection holders 108 of electrical power system 104. While one reader 120 and one processor-based device 122 is shown in FIG. 1, it is understood that multiple readers 120 associated with the same or different panels 106 of the electrical system 104 may communicate with one or more processor-based devices 122 as necessary or as desired, particularly for larger electrical system 104 having a number of panels 106 in different locations and where a number of persons are responsible for maintaining the electrical system 104 and responding to open circuit events.

In an exemplary embodiment, the detector 120 wirelessly transmits data and information corresponding to detected circuit protectors 102, to the remote location via a Wi-Fi communications link 125 or other mode of wireless communication. Alternatively, communication between the detector 120 and the processor-based device 122 may be established via a direct or indirect, hard wired connection such as an Ethernet connection 127 or another Local Area Network (LAN), or a wide area network (WAN) connection. Communication between the detector 120 and the processor-based device 122 may also be accomplished via the Internet, for example, using a web-based protocol, or by other mediums and techniques familiar to those in the art.

In an exemplary embodiment, the circuit protector holder identification elements 112 and the detector 120 communicate wirelessly with one another via a radio frequency communication scheme. Specifically, in one embodiment, the monitoring system 100 may operate in accordance with known radio frequency identification (RFID) or equivalent systems. As such, and as those in the art may appreciate, the circuit protector holder identification elements 112 may be RFID identification tags or equivalents, sometimes referred to as an RF chip, and the detector 120 may be an RFID reader or an interrogator. Thus, the circuit protector holder identification elements 112 and detector 120 operate on close proximity electromagnetic or inductive coupling of the detector 120 and the circuit protector holder identification elements 112 to communicate with one another, or alternatively operates using propagating electromagnetic waves.

In one embodiment, the circuit protector holder identification elements 112 are passive RFID tags coupled to the non-conductive base 109 of each respective fuse holder 108. The RFID tags may be integrated with adhesive labels and the like to quickly and easily retrofit existing fuse holders to the monitoring system 100. The detector 120 may include an antenna 124 mounted proximate the fuse holders 108, with signals generated from the antenna 124 powering the passive RFID tags and causing them to generate return signals to the antenna 124 for analysis. Each of the circuit protector holder identification elements 112 may be provided with information that identifies the fuse holder and other information as desired. By virtue of the circuit protector holder identification elements 112, each of the holders 108 in the panel 106 may be specifically identified and monitored by the system 100. As explained below, the monitoring system 100 can determine when a circuit protector is installed in one or more the holders 108, and in some embodiments can further identify which circuit protector 102 is in which holder 108. That is, the monitoring system 100 is capable of correlating specific circuit protectors 102 with specific holders 108 and providing a real time inventory of all installed circuit protectors and their precise location in the electrical system 104. That is, the monitoring system 100 can intelligently determine whether or not circuit protectors are installed at all, and which circuit protectors 102 are installed in which locations in the larger electrical system 104.

While passive RFID tags are believed to be advantageous for use as the circuit protector holder identification elements 112 for cost reasons, it is recognized that active RFID tags could likewise be used for circuit protector holder identification and monitoring purposes. Additionally, it is contemplated that still other forms and types of wireless communication may be utilized in lieu of RFID communication as described, including but not limited to other radio frequency devices, infrared devices, magnetic based sensors, electromagnetic based sensors, acoustic sensors, chipless RFID devices, and standing acoustic wave (SAW) technology. Various types of detectors 120 are contemplated that are compatible with various types of identification elements, including an RFID reader or interrogator, a magnetic card reader, a bar code scanner, an X-ray scanner, or another known and established technology in which the circuit protector identification elements 112 may communicate with or otherwise be identified by the detector 120.

It is also contemplated that in still other embodiments, the circuit protector identification elements 112, instead of being retrofittable to existing panels 106 and/or circuit protection holders 108, could be built-in to the panel 106 or the circuit protection holders 108 and communicate with the reader 120 via a wireless or hard-wired connection.

In the embodiment shown in FIG. 1, each of the circuit protectors 102 is also provided with a circuit protector identification element 126 that can also be monitored with the detector 120. The circuit protector identification elements 126 may also be passive RFID tags as described above, and may be provided with information that identifies the circuit protector, its type, and its rating, among other things. Alternatively, the circuit protector identification element 126 may utilize other communication technologies described above in lieu of RFID techniques. By virtue of the circuit protector identification elements 126 and the circuit protector holder identification elements 112, the monitoring system 100 is capable of detecting circuit protectors as they are introduced, assigning them to specific holders 108 in the panel 106 as they are installed, and determine whether the assigned circuit protectors are of the proper type and rating.

Additionally, by virtue of the circuit protector identification elements 126, the monitoring system 100 may detect an operating state of the circuit protectors 102. That is, the circuit protector identification elements 126 can also be read or detected by the detector 120 to determine whether or not each fuse 102 is in an operative, current carrying state or an opened, non-current carrying state interrupting a portion of the circuitry. In an exemplary embodiment, the circuit protector identification element 126 may be RFID sensor tags such as those described in commonly owned U.S. Pat. No. 7,369,029 (including methodology for determining fuse states) and U.S. Published Patent Application No. 2008/0231410, the disclosures of which are hereby incorporated by reference in their entirety. In another embodiment, other fuse state sensing, detection, and indication technology may be utilized. However detected, as soon as one of the circuit protectors 102 operates to open a circuit path, an alarm or notification will be sent to appropriate persons for prompt attentions and corrective action, such as replacement of an operated fuse.

Based upon communication with the circuit protector holder identification elements 112 and the circuit protector identification elements 126, the monitoring system 100 is further capable of distinguishing between different types of circuit interruption events, such as when a circuit protector 102 is physically absent (i.e., not present or not installed) in the panel 106, when an installed and present circuit protector 102 such as a fuse has operated to interrupt a portion of the circuitry in the electrical system 104, and when an installed circuit protector 102 such as a fuse has been removed from the panel 106, and whether or not a removed circuit protector 102 has been replaced. Different types of notification or alarms could be presented to workers in any of these situations. Additionally, the monitoring system 100, by virtue of the detectable elements 112 and 126, can identify mismatched circuit protector and holder combinations (e.g., fuses having voltage ratings that exceed the holder voltage ratings) or even improperly installed circuit protectors.

In an exemplary embodiment involving passive RFID tags, the circuit protector identification elements 126 and the circuit protector holder identification elements 112 will have 192-bit of configurable memory available. The memory can be programmed with any useful data about the circuit protector, including but not necessarily limited to a circuit protector identifier, a type code, a rating code, a location code a date of manufacture code, etc. The identification elements 126 and 112 can be queried anytime by the detector 120 for all the circuit protector holders 108 and the circuit protectors 102 in range of the antenna 124.

Figure 2:
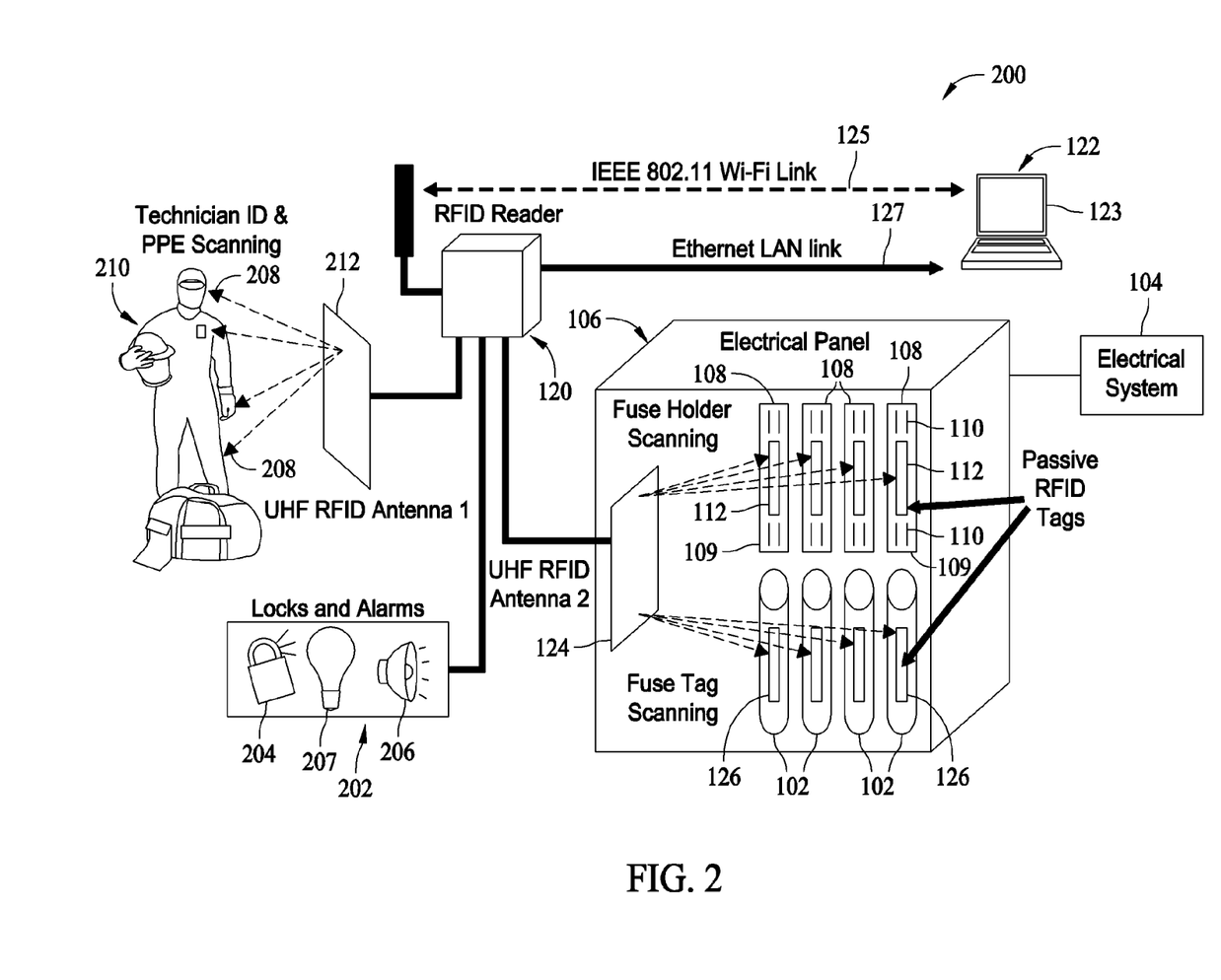
FIG. 2 is another schematic illustration of an exemplary circuit protector monitoring and management system.

FIG. 2 is another schematic illustration of an exemplary circuit protector monitoring system 200 that is similar to the system 100 described above, but with additional circuit protector features. Common features of the systems 100 and 200 are indicated with like reference characters in FIGS. 1 and 2.

As shown in FIG. 2, the system 200, in addition to the features of the system 100, provides enhanced operation and numerous additional benefits for monitoring and ensuring a proper use of personal protective gear in light of potential hazards to persons, including but not limited to arc flash hazards when servicing energized electrical circuitry, as well as access control features to prevent unauthorized or unprotected persons from accessing potentially hazardous conditions associated with the circuit protectors 102 when the panel is accessed while the electrical system 104 remains energized. As such, the system 200 may electronically monitor and confirm, in addition to the proper installation and operational state of the circuit protectors 102 in the panel 106, the proper use of protective gear by appropriate persons attending to tasks presenting potentially hazardous conditions. The system 200 provides a degree of safety and security that largely, if not completely, avoids human error or confusion regarding recommended or personal protective equipment (PPE) for performing necessary tasks associated with servicing or maintaining the electrical system 104.

To this end, the system 200 additionally includes an access control and alarm element 202 that is operationally coupled to the reader or detector 120 and/or the processor-based device 122. The access control and alarm element 202 may include one or more lockout devices 204, and one or more audio devices 206 or visual devices 207 effective to summon the attention of nearby persons who may act accordingly in response to take appropriate safety, security, or other measures detected by the system 200. The lockout devices 204 may correspond to lock or latch mechanisms on closeable doors provided on the face of the panel 106 providing access to the circuit protectors when opened. Each lock or latch mechanism may, in turn, be provided with one or more door latch and/or position sensors to monitor and confirm whether the panel doors are closed and locked to provide optimal degrees of safety to nearby persons.

The lockout devices 204 may be operated to permit or deny access to the circuit protectors 102 by unlocking or locking the doors in response to conditions detected by the system 200. The audio and/or visual devices and 206 may be activated appropriately to provide warnings and notification in the vicinity of the panel 106 of for, example, persons not wearing appropriate and recommended personal protective equipment (PPE) when attempting to service the panel 106 under live or energized circuit conditions.

The detector 120 may be adapted to communicate with one or more equipment identification elements, generally represented at 208 in FIG. 2, coupled to items of PPE as shown in FIG. 2. Such PPE items may include, as shown in FIG. 2, a hard hat, a face shield, a flame resistant neck protector, an ear protector, a protective suit, an insulated rubber glove, an insulated piece of footwear, and an insulated tool to be used by a person, as generally referenced by the number 210 in FIG. 2. The PPE items 210 may be insulated or otherwise adapted to provide protection to the person in the event of an arc flash incident occurring while the person is servicing the energized electrical circuitry in the electrical system 104 at the location of the panel 106, or alternatively to address other concerns or other types of hazards.

For communicating with the equipment identification elements 208, an antenna 212 may be located exterior to the panel 106 and may be utilized by the detector 120 to detect and identify equipment identification elements 208 coupled to the items of PPE possessed by one or more persons 210. Each of the PPE items, or additional items in further embodiments, may be provided with its own equipment identification element 208, or alternatively only representative items may be provided with an equipment identification element 208. Multiple items of PPE belonging to different workers may be more or less simultaneously detected by the system 200. Equipment identification elements 208 may be coupled to items of PPE in any manner desired, including stitching or sewing, adhesive labels and the like, or with clips, ties, fasteners and other known techniques. Various types of equipment identification elements 208 are contemplated, including but not limited to RFID tags such as those described above, or other technology referenced above for the circuit protector holder identification elements 112 and the circuit protector identification elements 126. Such technologies include, for example, smart cards, magnetic cards that may be read by the detector, bar coded elements, and elements adapted to be detected via x-ray scanning.

Once PPE items are detected by virtue of the equipment identification elements 208, the PPE items may be identified and confirmed as being of the appropriate level, type or grade for performing work on the electrical system 104 at the location of the panel 106. If the identified PPE items are proper, the lockout devices 204 may be operated to unlock the panel 106 and provide access to the circuit protectors. The audio and visual devices 206 and 207 may be operated as feedback devices to alert the person 210, or other persons, of a successful or unsuccessful PPE item detection. Also, feedback may be provided to the person 210 regarding which PPE items were detected or undetected, or determined to be improper for a task to be performed.

PPE detection and methodology is more completely described in copending U.S. application Ser. No. 12/359,518 filed Jul. 26, 2009 and entitled System and Method for Ensuring Proper Use of Personal Protective Equipment for Work Site Hazards, the disclosure of which is hereby incorporated by reference in its entirety.

When the circuit protector holder identification elements 112, the circuit protector identification elements 126 and the equipment identification elements 208 are all of the same type, such as for example passive RFID tags recognized by a single detector 120, the system 200 is fully capable of providing comprehensive circuit protector monitoring (both for proper installation and for operating state detection), assuring a recommended PPE compliance for workers 210, and personnel access control features in a relatively low cost manner compared to other known systems and methods for similar purposes, which tend to be provided in separate and independent systems, if at all. A reliable and low cost, yet very powerful and thoroughly comprehensive platform of circuit protector monitoring provided by the system 200, may ensure optimal operation and protection of the electrical system 104 via electronic monitoring, detecting of changes, and confirmation of the circuit protectors 102 over extended periods of time.

Further, the system 200 is rather easily retrofittable to an existing electrical panel 106 and electrical system 104 by supplying the reader 120 and appropriate antennas 124 and 212, applying the circuit protector holder identification elements 112, the circuit protector identification elements 126 and the equipment identification elements 208, and linking the detector to the processor-based device 122. In such a scenario, minimal hardware development is required to effect the system. In one embodiment, all logic necessary to functionally of the system may reside in firmware of the reader 120. In another embodiment, the logic necessary to functionally of the system may be provided in software.

While having a single detector 120 communicating with different identification elements 112, 126 and 208 for different purposes is beneficial and advantageous, it is not necessarily required. In other embodiments, more than one reader or detector 120 may be provided using the same or different detection technologies for similar purposes and effect.

III. Exemplary Methods of Managing Circuit Protectors

Having now described the electronic monitoring systems 100 and 200 in some detail, the operation of the systems will be described using the following processes and exemplary algorithms executable by the processor-based devices, such as the device 122 shown in FIGS. 1 and 2 and/or firmware of the detector 120. More specifically, FIG. 3 illustrates a circuit protector installation algorithm 300 executable by the system

Figure 4:
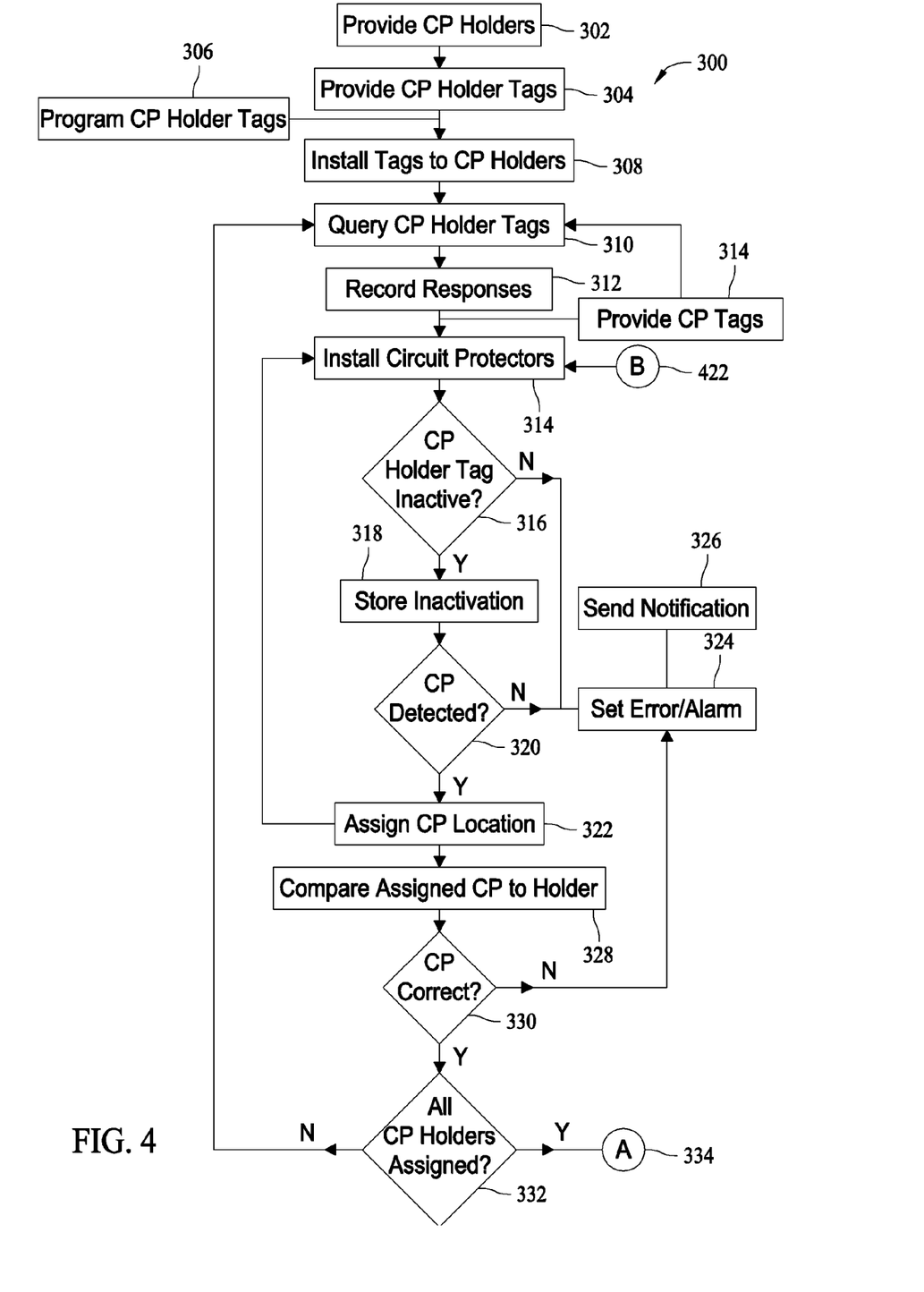
FIG. 4 illustrates a second method flowchart of a circuit protector monitoring algorithm and processes executable by the systems shown in FIG. 1 or 2.

100 or 200, and FIG. 4 illustrates a circuit protector monitoring algorithm 400 executable by the systems 100 or 200, where applicable.

Figure 3:
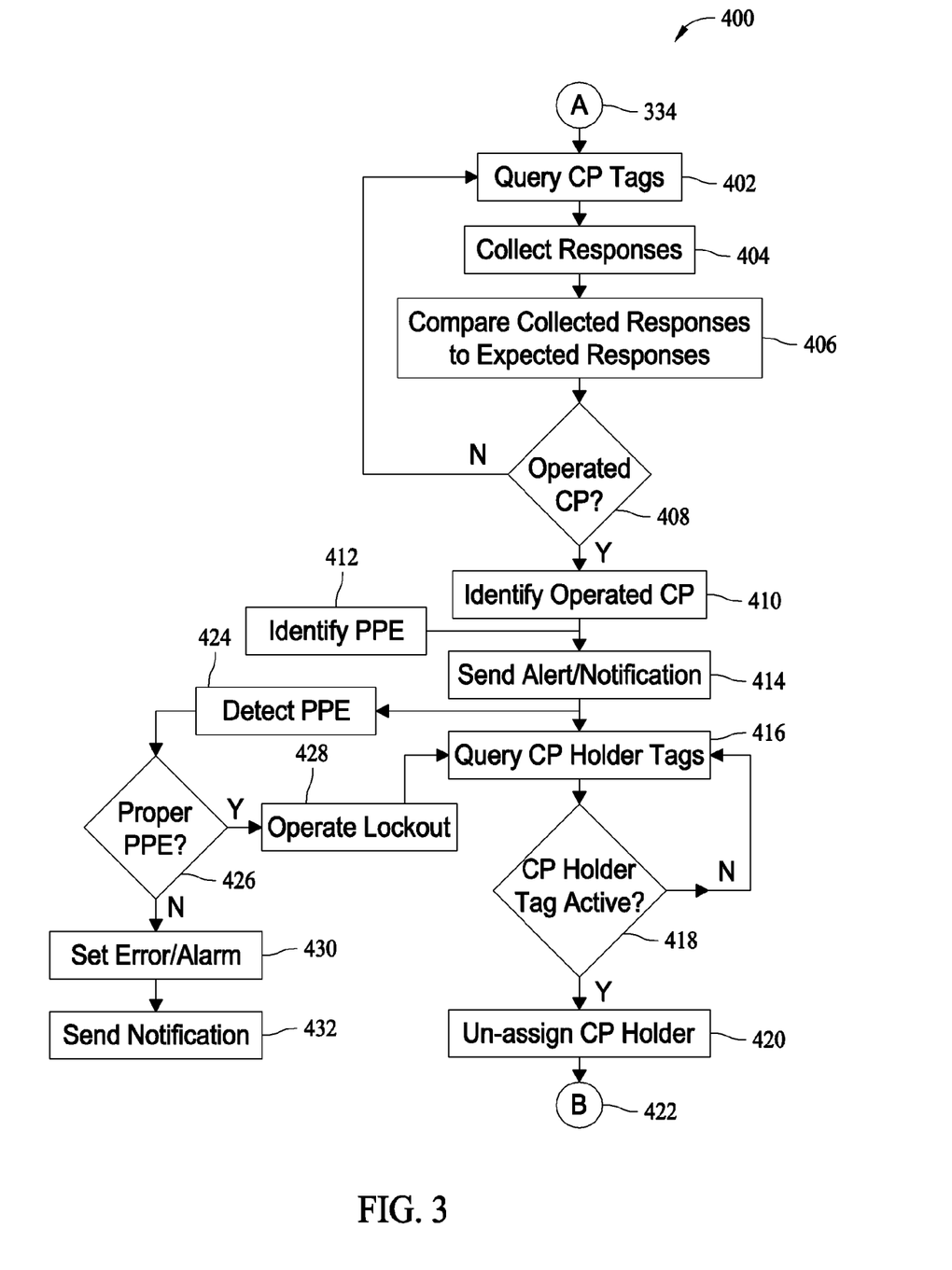
FIG. 3 illustrates a first method flowchart of a circuit protector installation algorithm and processes executable by the systems shown in FIG. 1 or 2.

Turning first to FIG. 3, preliminary to operation of the monitoring systems, the circuit protector holders are provided at step 302 and the circuit protector holder identification elements are provided at step 304. The circuit protector holders may be pre-existing in an electrical system or newly introduced as an electrical system is constructed or otherwise modified. The circuit protector holder identification elements may be provided before or after the circuit protector holders are introduced. Any of the circuit protector holders and identification elements described above may be provided. In the case of RFID tags being utilized as the circuit protector holder identification elements, the tags may further be programmed 306 with information of interest for the respective circuit protector holders, including information needed to determine whether or not an installed circuit protector is proper or improper. In the case of fuse holders, the programmed information may include a fuse type (e.g., fast acting or time delay fuse), a fuse class, a fuse rating, and even a fuse manufacturer for fuses that are compatible with the fuse holder. Alternatively, the programmed information may include information concerning the fuse holder itself, such as voltage or current rating for the fuse holder, manufacturer data, date of manufacture, date of installation, etc.

Once the circuit protector identification elements are provided and programmed at steps 304 and 306, they may be installed 308 to the circuit protector holders via any of the techniques described above or known in the art. The monitoring systems 100 or 200 are now ready for use.

As shown at step 310, once the systems 100 or 200 are powered up or otherwise activated, the detector is activated to query or otherwise detect the circuit protector holder identification elements. Any response or detection made by the detector is recorded at step 312, and a Table of circuit protector holders may be populated and stored in system memory. Therefore, as an initial matter, the processor based-device(s) in the systems 100 or 200 can determine how many circuit protector holders are present and are eligible to receive circuit protectors such as fuses. Additional circuit protection holders having identification elements may be provided 314 at any time and automatically recognized and recorded by the system. Also, removal of circuit protection holders having identification elements, or inoperative identification elements, will likewise be sensed by the detector and recognized and recorded by the monitoring system.

As an illustrative example using a passive RFID tag as the circuit protector identification elements for fuse holders, each fuse holder may be identified to the system as follows. A first fuse holder, referred to as Fuse Holder 1, may include an RFID tag with the following ID: 1234 5678 9098 7654 3210 ABCA. A second fuse holder, referred to as Fuse Holder 2, may include an RFID tag with a different ID such as 1234 5678 9098 7654 3210 ABCB. A third fuse holder, referred to as Fuse Holder 3, may have still another RFID tag ID such as 1234 5678 9098 7654 3210 ABCC. Any desired number of RFID tags having unique IDs may be provided, with the IDs allowing the fuse holders to be specifically identified and distinguished from one another by the detector 120 and or the processor-based devices 122.

In a further example, each RFID tag may include a 96-bit memory that may be programmed and encrypted with information including part numbers for fuses that each fuse holder can accept. As will be seen below, such information may be utilized to identify mismatched/improperly installed fuses.

As seen at step 316, the circuit protectors such as fuses may now be installed into the circuit protector holders. In one embodiment, as circuit protectors such as fuses are inserted into the holders, the respective circuit protector identification element becomes inactivated an undetectable by the system. In the case of passive RFID tags, this could be accomplished by electrically shorting the antenna of the RFID tag by pressing it against a conductive portion of the fuse or the fuse holder when the fuse is inserted, by other mechanical means, or by magnetic techniques familiar to those in the art. The result is to temporarily "kill" the response of the RFID tag attached to the fuse holder when a fuse is inserted, while still allowing the RFID tag to respond when the fuse is removed.

As shown at step 316, the system can determine whether and where circuit protectors are being installed by looking for inactivation of the circuit protector identification elements that it has recorded at step 312. It is assumed for purposes of the RFID tag example that the tag has become inactivated when it no longer responds to a query at step 310. Any detected inactivation is stored at step 318 and it may be inferred that a circuit protector has been installed in the circuit protector holder corresponding to the inactivated identification element.

In embodiments wherein the circuit protectors themselves are provided with circuit protector identification elements that are uniquely identifiable, and as shown at step 320, the reader may detect and identify the circuit protector identification element at a point in time before the circuit protection identification holder became inactivated at step 316. This allows circuit protectors to be correlated with circuit protectors as they are installed. Continuing with the RFID tag example, the RFID reader will now see a Fuse Holder tag ID disappearing from its Table and a Fuse tag ID appearing at almost the same time. If the circuit protector identification element is detected within a short timeframe of the activation, it may be assumed that the detected circuit protector has been installed into the circuit protector holder with the inactivated circuit protector identification element. As such, the detected circuit protector may be identified and electronically assigned 322 to a specific and uniquely identifiable circuit protector holder that was recognized and recorded at step 312. A Table of installed circuit protectors and their locations may be populated and stored in system memory.

An exemplary truth table of the logic to interpret the presence or absence of tags on a fuse and a holder is set forth below in Table 1.

TABLE 1

| Fuse Tag Present | Fuse Holder Tag Present | Output |
| --- | --- | --- |
| Yes | Yes | Illegal condition/Error |
| Yes | No | Fuse Holder is Loaded |
| No | Yes | Fuse Holder is Empty |
| No | No | Retry |

Optionally, during installation of the circuit protectors, steps may be taken to ensure that the monitoring system can read one and only one "new" circuit protector entering its field at any given point in time. Such steps may be desirable in instances, for example, wherein an installer is holding one or more circuit protector fuses in one hand while inserting a circuit protector into one of the holders with his or her other hand. In the case of fuses for example, such assurance may be accomplished by providing the fuses with a removable metalized tape or other element covering the tag and making it unreadable or undetectable by the monitoring system until removed by the installer. In systems having relatively fast detection cycles such precautions may be practically unnecessary. RFID readers are known, for example, that can read 170 or more tags per second, making it highly unlikely that a technician could introduce more than one circuit protector in such a short time interval (6 ms in this example) so as to present ambiguity to the system regarding where a detected circuit protector was actually installed.

Once a circuit protector is successfully assigned at step 322, additional circuit protectors may be installed at step 314 and further electronically detected and assigned to a specific and uniquely identifiable circuit protector. If no circuit protectors are detected at step 320 within a predetermined time period, an error or alarm condition may be set at step 324. Local alarm devices such as those described above may be activated to indicate an error condition, and notification may be generated and sent to specific persons via the processor based device at step 326. Various notification techniques and methods may include, for example, one or more electronic screen displays presented to a user, email notification, fax notification, text message notification, voice messaging notification, pager notification, or other techniques known in the art, As circuit protectors are installed, and assigned to specific circuit protection holders, at step 330 the system compares each circuit protector to each respective assigned circuit protector holder to determine whether or not the installation of the circuit protector is proper or improper. For example, the comparison may involve a look up table to determine whether the part number of the assigned circuit protector matches a compatible part number for the holder, whether the voltage or current rating match, whether the circuit protector is of the correct type for the holder, etc.

If an installed circuit protector is determined to be incorrect at step 330, an error or alarm condition can be set at step 324 and/or electronic notification can be sent at step 326.

If an installed circuit protector is determined to be correct at step 330, the system at step 332 may further determine whether all detected and recorded circuit protector holders at step 312 include circuit protectors assigned to them. If not, the system returns to step 310 and operates the detector to again sense the circuit protector holders and circuit protector holders and continue the installation analysis and determinations. If yes at step 332, the system may enter the monitoring algorithm at point 334.

At this point, at a system level it is known which circuit protectors are installed in which holders. A real time inventory of installed circuit protectors, is therefore available to interested persons, including electrical panel level geographic information and other information desired for each circuit protector. Such information can be invaluable to electrical facility managers and technicians, as it tends to be difficult to compile otherwise or keep it up to date as changes are made.

If an attempt is made to install a circuit protector without an identification element recognized by the detector, the system is capable of detecting this as well. For example, in the RFID example for fuses, the system will see a fuse holder tag disappearing at step 316 but no valid fuse tag appearing in its place at step 320. After a predetermined period of time the system may conclude that a fuse was indeed placed in the holder, but is not system compatible. Appropriately, error or alarm conditions can be set and/or electronic notification can be sent so that such a condition can be corrected. Similarly, if a circuit protector identification element is detected but is not determined to be compatible with the system, alarm and error conditions can likewise be detected and notifications can be sent.

Turning now to the circuit protector monitoring algorithm 400 shown in FIG. 4, the detector continues to be operated at step 402 and senses the circuit protector identification elements at step 404. In one example involving fuses and RFID tags, when a fuse operates to open a circuit path therethrough, heat and energy associated with the opening of the fuse damages the RFID tag and prevents the tag from responding to the reader. Thus, as shown at step 406, by comparing collected responses from the circuit protector tags with expected responses, which may be determined through the installation algorithm described above, the system may determine at step 408 operation of any monitored circuit protector. The system may further uniquely identify an operated circuit protector at step 410. At this time necessary alarm conditions will be sent and/or notification will be sent. The notification may include all information necessary for a technician to quickly locate and replace the fuse, including but not limited to geographic information, replacement fuse information, hazard information and recommended personal protective equipment (PPE) items for attended to the operated circuit protector. As shown at step 412, recommended PPE items may be identified by look-up tables stored in system memory and the like and included in any alerts or notification sent by the system at step 414.

Continuing with the RFID fuse monitoring example, when a technician arrives to service the electrical panel to restore affected circuitry after a fuse has opened or operated, the technician will remove the old operated fuse. Because the detector continues to query the fuse identification elements at step 416, and as soon as the operated fuse is removed the fuse holder tag will become active again and will respond to the reader. When this occurs, and as shown at step 418, the system will again see the activated fuse holder tag and can determine that the fuse holder is empty (i.e., does not have a fuse installed in it). Once this determination is made, the circuit protector holder can be deemed unassigned at step 420 and the system returns to the installation algorithm at point 422 and waits to detect a replacement fuse, assign it and confirm that is proper as described above. Thus, circuit protectors may be assigned and re-assigned to the circuit protector holders so that the system remains up to date regarding which circuit protectors are installed and where.

As also shown in FIG. 4, in embodiments wherein the circuit protectors are to be serviced "live" without powering down the electrical system, and or more PPE items includes equipment identification elements as described above, the reader also may detect items of PPE as shown at step 424 when a worker or worker arrives to service the electrical system. Once PPE items are detected, the system may compare them to predetermined recommended PPE items stored in system memory and determine whether or not the PPE items are proper at step 426. If the detected PPE items are determined to be proper, lockout devices such as those described above may be operated at step 428 and the worker(s) may be provided access to the circuitry. If the detected PPE items are determined to be improper, error and alarm conditions may be set at step 430 and electronic notification may be sent at step 432.

IV. Conclusion

Multiple embodiments of the inventive systems and methods for monitoring and managing circuit protectors have now been explained and the benefits of the invention are believed to be amply demonstrated.

In one aspect, a circuit protector management system is disclosed that comprises: at least one circuit protection holder provided with a holder identification element; a detector recognizing the holder identification element; and a processor based device configured to correlate the holder identification tag with an installed circuit protector.

Optionally, the circuit protector may be adapted to provide overcurrent protection, and may further be a fuse. The detector may wirelessly communicate with the holder identification element. The holder identification element may be a radio frequency identification tag, and the detector may be a radio frequency identification reader device. The circuit protector holder identification element may be disabled when the circuit protector is installed to the circuit protection holder.

The holder identification element may be adhered to a surface of the circuit protection holder, thereby retrofitting the circuit protect holder to the circuit protector management system.

Further, the circuit protector may optionally include a circuit protector identification element, the circuit protector identification element also being recognized by the detector. The processor based device may correlate the holder identification tag with an installed circuit protector when the circuit protector identification element is recognized by the detector and when the holder identification element is not recognized by the detector. The processor based device may be configured to compare the correlated holder identification element and the circuit protector identification element to determine whether the circuit protector is proper or improper.

The circuit protector holder may be mounted to an electrical panel, and the system may further include an antenna coupled to the panel and communicating with the detector. The detector may also be configured to recognize items of personal protective equipment, and determine whether recognized items of personal protective equipment are proper or improper. A lockout device may be provided, with the processor based device operating the lockout device to permit or deny access to the circuit protection holder.

In another aspect, a circuit protector management system is described that comprises: a fuse holder adapted to receive at least one electrical fuse; at least one fuse holder tag coupled to the fuse holder; and a reader configured to communicate with the at least one fuse holder tag, wherein the reader communicates with the at least fuse holder tag when the fuse holder is empty and the reader is prevented from communicating with the at least one fuse holder tag when the electrical fuse is inserted in the fuse holder.

Optionally, the electrical fuse may include a fuse identification element, with the reader communicating with the fuse identification element to detect installation of the fuse. The reader may be a radio frequency identification interrogator device. The system may also include a processor based device configured to identify each fuse installed in the fuse holder, and determine, based upon communications between the reader and the at least one fuse holder tag, whether or not an installed fuse is proper or improper. The processor based device may be configured to generate a notification of an improper fuse.

Still further, the fuse holder may be mounted to a lockable electrical panel. The system may include a processor based device and a lockout device operable by the processor based device. The reader may be configured to communicate with personal protective equipment tags, and the processor based device may operate the lockout device in response to detected personal protective equipment tags.

A method of managing circuit protectors in an electrical system is also described. The method is executable by an electronic management system, and comprises: electronically detecting at a first point in time a presence of at least one circuit protection holder identification element corresponding to a circuit protection holder; electronically detecting at a second point in time a presence of at least one circuit protector identification element corresponding to a circuit protector; and electronically determining whether or not the circuit protector is installed to the circuit protection holder.

Optionally, determining whether or not the circuit protector is installed comprises: electronically detecting a condition wherein the circuit protector identification element is present but the circuit protection holder identification element is not present. The method may also comprise electronically assigning the circuit protector to the circuit protection holder as the circuit protector is installed, and electronically comparing detected characteristics of the assigned circuit protector with detected characteristics of the circuit protector identification element to determine whether the circuit protector is proper or improper. The detected characteristics may include one of a circuit protector type identifier, a circuit protector location identifier, and a circuit protector manufacturer identifier.

Electronically detecting may comprise operating a radio frequency identification reader device to communicate with the circuit protection holder identification element and the circuit protector identification element. The method may also include electronically un-assigning the circuit protector from the circuit protection holder when the circuit protector is detected as being removed from the circuit protection holder; electronically detecting at a third point in time a presence of another circuit protector identification element corresponding to another circuit protector; and electronically re-assigning the another circuit protector to the circuit protection holder when the circuit protector holder identification element can no longer detected.

The method may further include electronically monitoring the circuit protector identification holder, and generating a notification when the circuit protector has operated to open a circuit path therethrough; electronically verifying whether persons proximate the circuit protection holder possess appropriate personal protective equipment; and operating a lockout device in response to the electronic verification of personal protective equipment. The circuit protector holder may be a fuse holder, and the circuit protector may be a fuse.

In still another aspect, an electronic circuit protector management system is described. The system comprises: means for connecting a circuit protector to an electrical system, the means for connecting provided with an identification element; means for detecting the identification element; and means for determining, based on communication with the means for detecting, whether a circuit protector is installed to the means for connecting.

Optionally the system further comprises means for identifying the installed circuit protector, allowing the means for determining to determine whether the installation of the circuit protector is proper. The means for connecting may comprise a fuse holder.

A circuit protector management system is also disclosed that comprises: at least one circuit protection holder provided with a holder identification element; a detector recognizing the holder identification element; and a processor based device in communication with the detector, the processor based device configured to determine whether a circuit protect protector is installed in the at least one circuit protection holder. The circuit protection holder is optionally a fuse holder and the circuit protector is a fuse.

A circuit protector management system is disclosed that comprises: a plurality of circuit protection holders each provided with a respective holder identification element; a detector recognizing the holder identification elements for each of the circuit protection holders; and a processor based device in communication with the detector. The processor based device is configured to determine whether circuit protectors are installed in each respective circuit protection holder.

Optionally, the processor based device may be configured to individually identify each circuit protector installed in the circuit protector holders. The circuit protection holders may be fuse holders and the circuit protectors may be fuses.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A circuit protector management system comprising:
   at least one circuit protection holder provided with a holder identification element;
   a detector recognizing the holder identification element; and
   a processor based device configured to correlate the holder identification tag with an installed circuit protector.

2. The system of claim 1, wherein the circuit protector is adapted to provide overcurrent protection.

3. The system of claim 1, wherein the circuit protector is a fuse.

4. The system of claim 1, wherein the holder identification element comprises a radio frequency identification tag.

5. The system of claim 1, wherein the detector wirelessly communicates with the holder identification element.

6. The system of claim 1, wherein the holder identification element is adhered to a surface of the circuit protection holder, thereby retrofitting the circuit protect holder to the circuit protector management system.

7. The system of claim 1, wherein the circuit protector includes a circuit protector identification element, the circuit protector identification element also recognized by the detector.

8. The system of claim 7, wherein the processor based device correlates the holder identification tag with an installed circuit protector when the circuit protector identification element is recognized by the detector and when the holder identification element is not recognized by the detector.

9. The system of claim 7, wherein the processor based device is configured to compare the correlated holder identification element and the circuit protector identification element to determine whether the circuit protector is proper or improper.

10. The system of claim 1, wherein the circuit protector holder is mounted to an electrical panel, the system further comprising an antenna coupled to the panel and communicating with the detector.

11. The system of claim 1, wherein the detector is a radio frequency identification reader device.

12. The system of claim 1, wherein the detector is further configured to recognize items of personal protective equipment.

13. The system of claim 12, wherein the detector is configured to determine whether recognized items of personal protective equipment are proper or improper.

14. The system of claim 1, further comprising a lockout device, the processor based device operating the lockout device to permit or deny access to the circuit protection holder.

15. The system of claim 1, wherein the circuit protector holder identification element is disabled when the circuit protector is installed to the circuit protection holder.

16. A circuit protector management system comprising:
    a fuse holder adapted to receive at least one electrical fuse;
    at least one fuse holder tag coupled to the fuse holder; and
    a reader configured to communicate with the at least one fuse holder tag, wherein the reader communicates with the at least fuse holder tag when the fuse holder is empty and the reader is prevented from communicating with the at least one fuse holder tag when the electrical fuse is inserted in the fuse holder.

17. The system of claim 16 wherein the electrical fuse includes a fuse identification element, the reader communicating with the fuse identification element to detect installation of the fuse.

18. The system of claim 17 wherein the reader is a radio frequency identification interrogator device.

19. The system of claim 17, further comprising a processor based device configured to identify each fuse installed in the fuse holder.

20. The system of claim 19, wherein the processor based device is further configured to determine, based upon communications between the reader and the at least one fuse holder tag, whether or not an installed fuse is proper or improper.

21. The system of claim 19, wherein the processor based device is configured to generate a notification of an improper fuse.

22. The system of claim 16, wherein the fuse holder is mounted to lockable electrical panel.

23. The system of claim 22, further comprising a processor based device and a lockout device operable by the processor based device.

24. The system of claim 23, wherein the reader is configured to communicate with personal protective equipment tags, and the processor based device operating the lockout device in response to detected personal protective equipment tags.

25. A method of managing circuit protectors in an electrical system, the method executable by an electronic management system, the method comprising:
    electronically detecting at a first point in time a presence of at least one circuit protection holder identification element corresponding to a circuit protection holder;
    electronically detecting at a second point in time a presence of at least one circuit protector identification element corresponding to a circuit protector; and
    electronically determining whether or not the circuit protector is installed to the circuit protection holder.

26. The method of claim 25, wherein determining whether or not the circuit protector is installed comprises:
    electronically detecting a condition wherein the circuit protector identification element is present but the circuit protection holder identification element is not present.

27. The method of claim 25, further comprising electronically assigning the circuit protector to the circuit protection holder as the circuit protector is installed.

28. The method of claim 27, further comprising electronically comparing detected characteristics of the assigned circuit protector with detected characteristics of the circuit protector identification element to determine whether the circuit protector is proper or improper.

29. The method of claim 28, wherein the detected characteristics include one of a circuit protector type identifier, a circuit protector location identifier, and a circuit protector manufacturer identifier.

30. The method of claim 25, wherein electronically detecting comprises operating a radio frequency identification reader device to communicate with the circuit protection holder identification element and the circuit protector identification element.

31. The method of claim 25, further comprising:
electronically un-assigning the circuit protector from the circuit protection holder when the circuit protector is detected as being removed from the circuit protection holder;
electronically detecting at a third point in time a presence of another circuit protector identification element corresponding to another circuit protector; and
electronically re-assigning the another circuit protector to the circuit protection holder when the circuit protector holder identification element can no longer be detected.

32. The method of claim 25, further comprising electronically monitoring the circuit protector identification holder, and generating a notification when the circuit protector has operated to open a circuit path therethrough.

33. The method of claim 25, further comprising electronically verifying whether persons proximate the circuit protection holder possess appropriate personal protective equipment.

34. The method of claim 33, further comprising operating a lockout device in response to the electronic verification of personal protective equipment.

35. The method of claim 25, wherein the circuit protector holder is a fuse holder, and the circuit protector is a fuse.

36. An electronic circuit protector management system comprising:
means for connecting a circuit protector to an electrical system, the means for connecting provided with an identification element;
means for detecting the identification element; and
means for determining, based on communication with the means for detecting, whether a circuit protector is installed to the means for connecting.

37. The system of claim 36, further comprising means for identifying the installed circuit protector, allowing the means for determining to determine whether the installation of the circuit protector is proper.

38. The system of claim 36, wherein the means for connecting comprises a fuse holder.

39. A circuit protector management system comprising:
at least one circuit protection holder provided with a holder identification element;
a detector recognizing the holder identification element; and
a processor based device in communication with the detector, the processor based device configured to determine whether a circuit protect protector is installed in the at least one circuit protection holder.

40. The system of claim 39, wherein the circuit protection holder is a fuse holder and the circuit protector is a fuse.

41. A circuit protector management system comprising:
a plurality of circuit protection holders each provided with a respective holder identification element;
a detector recognizing the holder identification elements for each of the circuit protection holders; and
a processor based device in communication with the detector, the processor based device configured to determine whether circuit protectors are installed in each respective circuit protection holder.

42. The system of claim 41, wherein the processor based device is configured to individually identify each circuit protector installed in the circuit protector holders.

43. The system of claim 41, wherein the circuit protection holders are fuse holders and the circuit protectors are fuses.

* * * * *